United States Patent
Harvey et al.

(10) Patent No.: US 6,226,030 B1
(45) Date of Patent: May 1, 2001

(54) AUTOMATED AND SELECTIVE DISTRIBUTION OF VIDEO BROADCASTS

(75) Inventors: John P. Harvey, Round Rock; Mark S. Kressin, Austin; Vincent J. Meriwether, Round Rock; Richard A. Mills, Austin; Michael C. Tulkoff, Cedar Park, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/829,555

(22) Filed: Mar. 28, 1997

(51) Int. Cl.⁷ ....................................................... H04N 7/10
(52) U.S. Cl. ................................ 348/7; 455/4.2; 709/219
(58) Field of Search ..................................... 348/7, 10, 12, 348/327, 328, 563, 565; 709/219; 455/4.2

(56) References Cited

U.S. PATENT DOCUMENTS

| | | | |
|---|---|---|---|
| 4,920,432 | * | 4/1990 | Eggers et al. . |
| 4,949,248 | * | 8/1990 | Caro . |
| 5,426,699 | * | 6/1995 | Wunderlich et al. . |
| 5,557,320 | * | 9/1996 | Krebs . |
| 5,583,863 | * | 12/1996 | Darr, Jr. et al. . |
| 5,583,864 | * | 12/1996 | Lightfoot et al. . |
| 5,583,920 | * | 12/1996 | Wheeler, Jr. . |
| 5,818,439 | * | 10/1998 | Nagasaka et al. ........................ 348/7 |
| 5,877,755 | * | 3/1999 | Hellhake ................................. 348/7 |
| 5,905,522 | * | 5/1999 | Lawler ..................................... 348/7 |
| 5,914,712 | * | 6/1999 | Sartain et al. ........................... 348/7 |

\* cited by examiner

Primary Examiner—Victor R. Kostak
(74) Attorney, Agent, or Firm—George R. Schultz; Volel Emile

(57) ABSTRACT

The system allows for the controlled distribution of video and/or audio broadcasts over a LAN to selected and approved client computers. The video broadcasts are received by at least one server on the LAN. A configuration file is created with identifying information from the various video feeds. The systems administrator can create a list of which client computers can have access to certain video feeds. When a client computer requests a video feed, a menu of video feeds approved for that client is constructed and displayed on the client computer. The display can include a selectable representative image of the available broadcast. When selected, a display window appears with the live video feed.

13 Claims, 6 Drawing Sheets

Click the image above to view this channel.

On channel 3: *CNBC Live*

Click the image above to view this channel.

On channel 4: *Misc Audio*

Click the image above to view this channel.

This request was generated by host there.austin.ibm.com with IP address 129.35.216.16.

402 ~~→ Video Transmission Status 400

The time now is 13:45:50 —404

Active Connections for Misc Audio 406

| Send To | | Requested By | Time Started | Time to Run (min:sec) | Time Left (min:sec) |
| --- | --- | --- | --- | --- | --- |
| Hostname | Port | | | | |
| there.austin.ibm.com | 51996 | there.austin.ibm.com | 13:40:29 | 15:00 | 09:39 |

414   416    Active Connections for ESPN2   422  424
         418         420

| Send To | | Requested By | Time Started | Time to Run (min:sec) | Time Left (min:sec) |
| --- | --- | --- | --- | --- | --- |
| Hostname | Port | | | | |
| there.austin.ibm.com | 51966 | there.austin.ibm.com | 13:41:58 | 15:00 | 11:08 |

408

Active Connections for CNBC Live

| Send To | | Requested By | Time Started | Time to Run (min:sec) | Time Left (min:sec) |
| --- | --- | --- | --- | --- | --- |
| Hostname | Port | | | | |
| there.austin.ibm.com | 51986 | there.austin.ibm.com | 13:41:21 | 15:00 | 10:31 |

410

Active Connections for CNN Live

| Send To | | Requested By | Time Started | Time to Run (min:sec) | Time Left (min:sec) |
| --- | --- | --- | --- | --- | --- |
| Hostname | Port | | | | |
| there.austin.ibm.com | 51976 | there.austin.ibm.com | 13:39:24 | 15:00 | 08:34 |

How to Delete a Video Transmission 412

Select the name to delete a stream.

Load Average for ethanol.austin.ibm.com

The current load average is: 0.36 0.29 0.15

(The idle 1, 5, and 15 minute load average is usually: 0.00 0.00 0.00)

Fig. 5

AUTOMATED AND SELECTIVE DISTRIBUTION OF VIDEO BROADCASTS

FIELD OF THE INVENTION

This invention relates to automated and selective distribution of video broadcasts. Video is received by at least one server connected in a networked environment. The video can then be selectively provided to a user with access to the network.

BACKGROUND OF THE INVENTION

Video broadcasts and televisions are ubiquitous. The broadcasts can contain a variety of content, ranging from entertainment to news. However, very few people have televisions at work and therefore cannot access video broadcasts during the day. This tends to isolate people from information during the very hours when many important events are occurring.

Instead of televisions, many in the work force have personal computers or work stations at their desks. These computers do not always work in strict isolation. Local area networks (LANs) now connect many workplace computers. The network uses a "server" computer to connect with and direct activities with the "client" computers located in individual offices. Computers can also be connected by means of a modem to bulletin boards and other commercial databases of information such as America Online or Prodigy. However, these sources typically only present text which was prepared earlier and then loaded onto the database being accessed.

Another source of information accessible by a computer is the Internet. A popular interface to the Internet is a software product known as a browser. The browser allows the user to search for particular sites on the Internet by presenting it the site's address or URL. The browser also takes advantage of hypertext markup language (HTML) links located at certain Internet sites that allows the user to quickly access additional sites. A particularly popular portion of the Internet is the World Wide Web (WWW), also known as "the web." The web is characterized by "home pages" controlled by companies and individuals. The best web pages have interesting and interactive graphics. However, even the best web pages present only textual information or short prerecorded video clips.

A need exists for a method of allowing networked computers to have access to live video broadcasts. Such a method should provide the user with a choice between broadcasts and yet maintain a level of control at the server level as to which live feeds are available to particular client computers. Such a system should also allow the user to customize the video display. For example, the live video display should be sizable to allow the user to simultaneously work on other projects with his computer.

SUMMARY OF THE INVENTION

The present invention relates to a "video jukebox" or sorts. It is a system or method of distributing live video broadcasts received by a server to selected client computers connected to the network. The system allows specific computers to receive only designated broadcasts. For example, the system could receive several live broadcasts including a financial news channel, a music channel and a general news channel. A first user in the accounting department might only be given access to the live feed from the financial news network, while a second user in the marketing department might be given access to the general news network, and a third user in management might only get access to the music channel to help relieve his job-related stress.

Video data is accepted onto the LAN through at least one server. If several video broadcast feeds are received, each might be assigned to a specific server. The video jukebox controls access to video data on a LAN in two ways. Both methods use a file system shared by multiple senders of video data. The first method uses a configuration file and multiple servers to allow system administrators to restrict access to video data. Each server sending video data to the LAN writes video frame data and accompanying descriptive information to a shared file system. This information uniquely identifies all video broadcasts. Each computer sending video data and each server has its own unique identity on a LAN. The system administrator uses the configuration file to direct each server to respond to requests for video data in a selective manner. Only those video sources specified in the configuration file for a particular server will be described in the server's response to requests for video data. Each request for video data is made by one client to one server. Successful requests for video data result in programs on the client machine accessing either multicast or unicast broadcasts made available to it by the server, despite the fact that the server has access to more sources of video data than those specified in the configuration file.

The second methodology uses a configuration file and a single server to allow system administrators to restrict access to video data. As in the first method described above, each computer sending video data writes video frame data and accompanying descriptive information to a shared file system. In contrast to the first method, however, only one server responds to client requests for video data. In this case the system administrator uses the configuration file to categorize clients into subgroups. Each request from a client is translated into a request from a specific subgroup, and the configuration file specifies which video broadcasts are to be made available to that subgroup. Consequently, only preselected broadcasts are made available to any request for video data from any specific client.

With either method, the request comes to the server via a World Wide Web (WWW) HTTP request from a client. The response is sent to the client via a WWW HTTP response packet. Upon receipt of a valid request for video data, the server sends descriptive information about each available broadcast to the client. This information is presented to the client in such a way that the client can use the provided video frame information provided to select the desired broadcast. Once a specific broadcast has been selected by the client, a program on the client's machine is started. It then waits to receive the video data associated with the selected broadcasts. In the meantime, the server establishes the data connections necessary to send the video data to the client, and then starts sending the data.

BRIEF DESCRIPTION OF THE DRAWINGS

The foreground aspects and other features of the present invention are explained in the following written description, taken in connection with the accompanying drawings, wherein:

FIG. 5 illustrates an exemplary report generated by the system to summarize usage of the system.

DETAILED DESCRIPTION OF THE DRAWINGS

Figure 1:
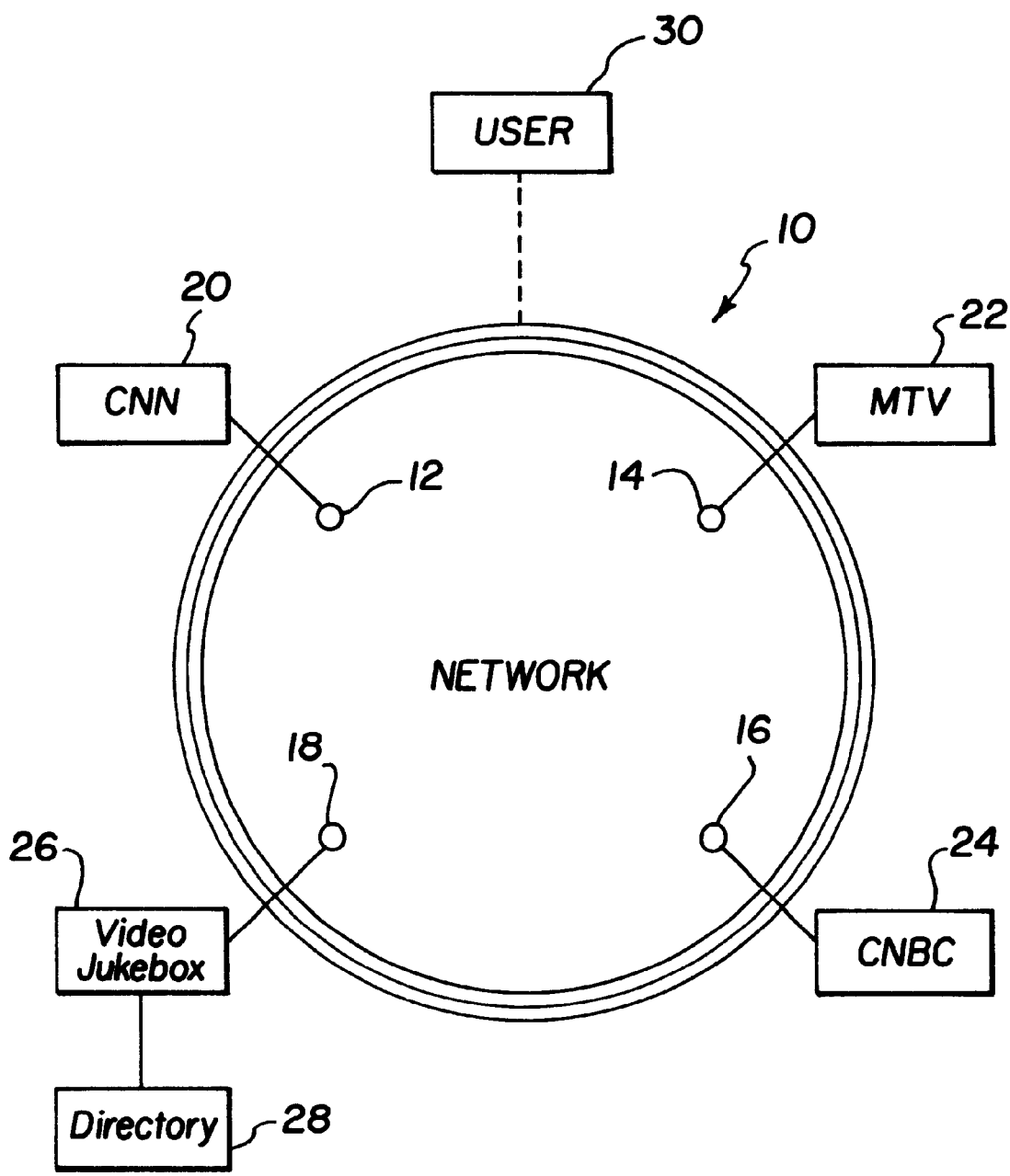
FIG. 1 is an illustration of a LAN having several servers, each receiving a specific live video broadcast.

FIG. 1 is an illustration of a LAN 10 having several servers 12, 14, 16, and 18. Each server is connected to a live video broadcast. For example, server 12 is receiving CNN 20, server 14 is receiving MTV 22, and server 16 is receiving CNBC 24. Information identifying each broadcast is stored in a directory 28 associated with the video jukebox 26. The software implementing the video jukebox is stored on server 18. The systems administrator has access to the directory 28 and thus can establish and modify a configuration file stored in the directory. The configuration file contains a listing of which user's client computers 30 can access which video feeds.

Figure 2:
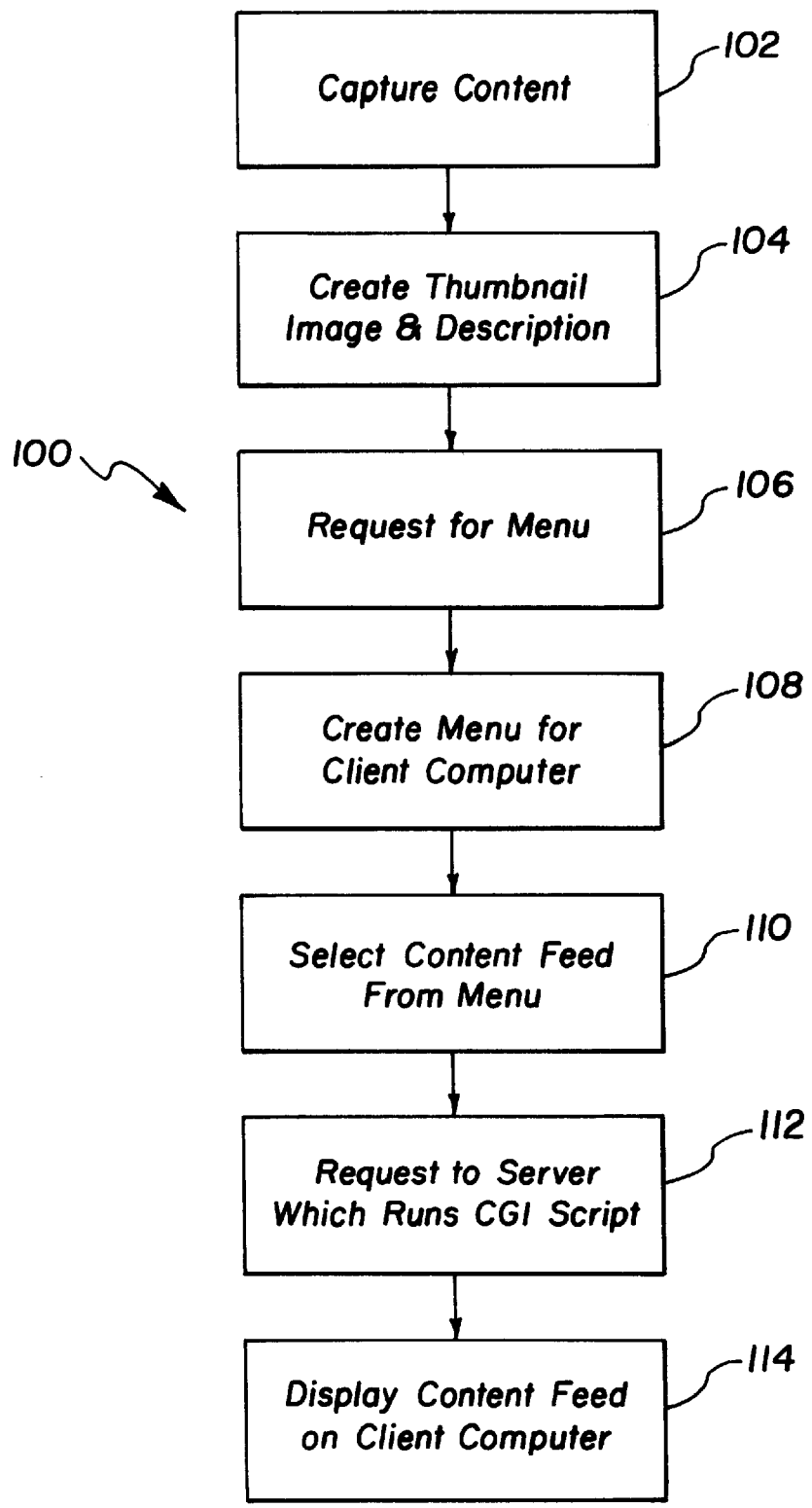
FIG. 2 is a flow chart of the method.

The general method 100 of implementing the video jukebox is illustrated with the flow chart of FIG. 2. Initially, video content must be captured 102 by the servers. This content can be from virtually any source. In this description, the well-known commercial services of CNN, MTV and CNBC have been used. However, the video could also be a company wide message from a company officer, or educational training videos for a particular department. Identifying information is then entered 104 for each video feed. Further a representative image is captured from the feed. The representative image is merely a single frame of the video feed.

A user at a client computer on the system can then request 106 a menu of broadcasts available for viewing. While several broadcasts might be available on the LAN, only certain ones might be authorized for the particular client computer. The video jukebox determines the available broadcasts and creates 108 a menu for the client computer. The menu is illustrated in FIG. 3. The user then selects 110 a content feed from the menu. The request is received 112 by the server 18 which runs a CGI script to direct the appropriate feed to the client computer.

The content is then displayed on the user's client computer 114.

Figure 3A:
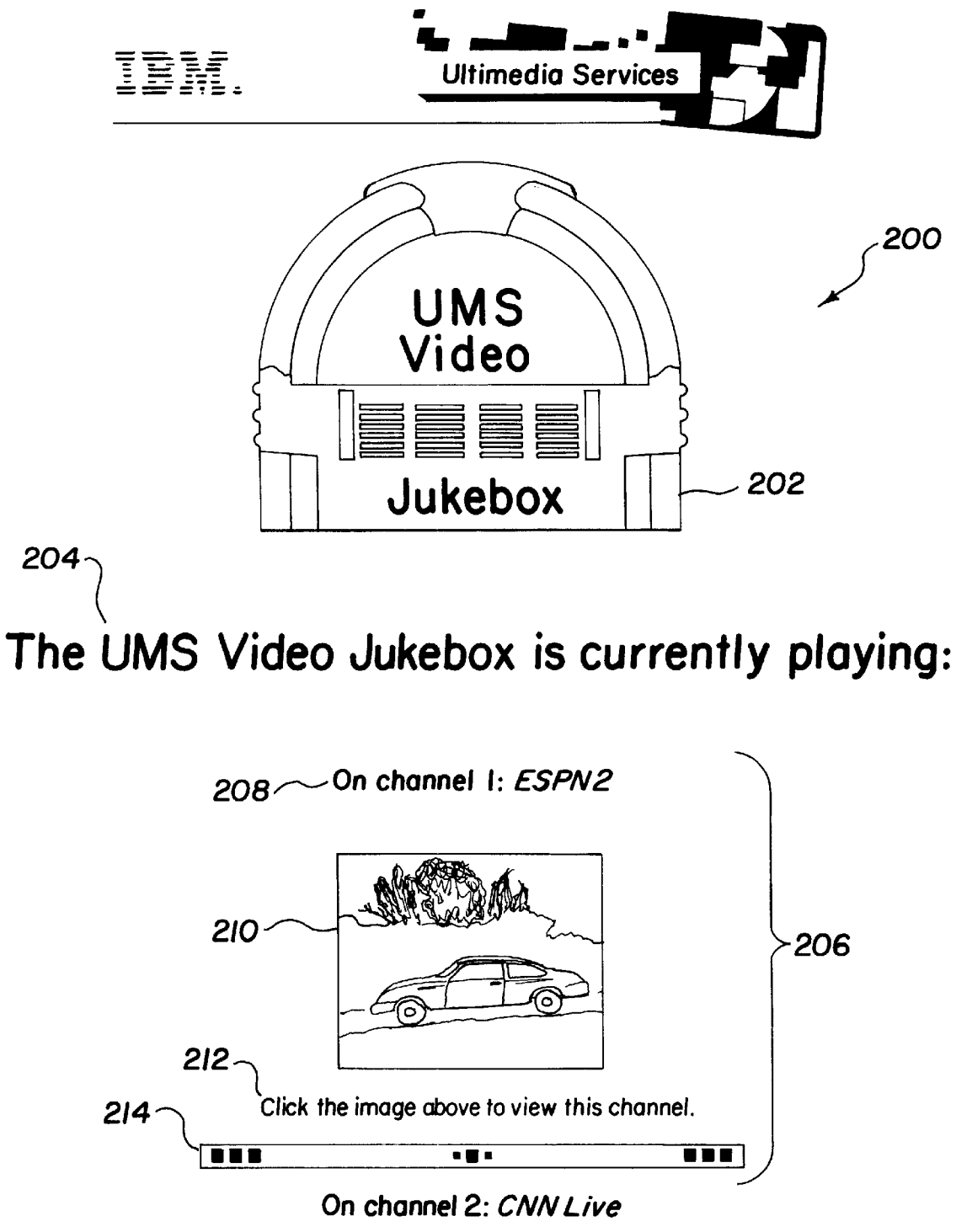
FIGS. 3a and 3b illustrate the menu provided to the client computer which includes video frame data and a representative sketch to identify the video broadcasts accessible to the user.
Figure 3B:
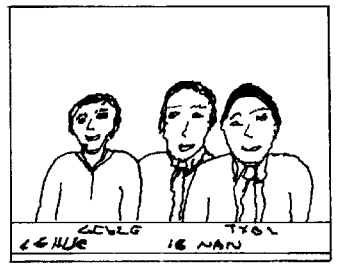
Figure 3B:
Figure 3B:
Figure 3B:
Figure 3B:
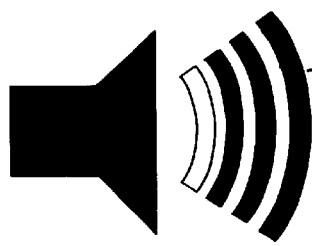
Figure 3B:

The menu 200 generated by the video jukebox software is illustrated in FIGS. 3a and 3b. The menu is typically displayed on the user's browser software. It allows the user to scroll down a menu of virtually any length. Thus, FIGS. 3a and 3b are the top and bottom half of a continuous menu. The menu 200 has a header 202 which can exhibit a graphic of a jukebox and the title "video jukebox." Under this header is a title line 204 which in this case states "The UMS Video Jukebox is currently playing:". Under the title line 204 is at least one "channel" available for the user. In this example, channel 1 is ESPN2 206, channel 2 is CNN Live 216, channel 3 is CNBC Live 218, while channel 4 is an audio channel 220. Each video channel contains a representative image 210 which graphically displays a sample of the video broadcast. For example, channel one 210 has a representative image 210 taken from the video feed. This image 210 can be updated after a predetermined time. The channel 206 display also includes a header 208 identifying the channel and its content. Further, each channel can have a footer 212 instructing the user to click on the image 210 to select the channel and a divider 214 to separate the channel displays. The video jukebox is preferably implemented in a language which allows the use of a computer pointing device or mouse. The user merely positions his pointing device on the image 210 and selects it by appropriately clicking one of the buttons on the pointing device.

As mentioned above, at least one of the channels can be an audio only channel without any video content. Instead of a representative image, an icon 224 can be used. Indeed, for video broadcasts as well, a standard icon could be used. Finally, a footer 222 can be placed at the bottom of the menu with descriptive information regarding the server which generated the menu.

Figure 4:
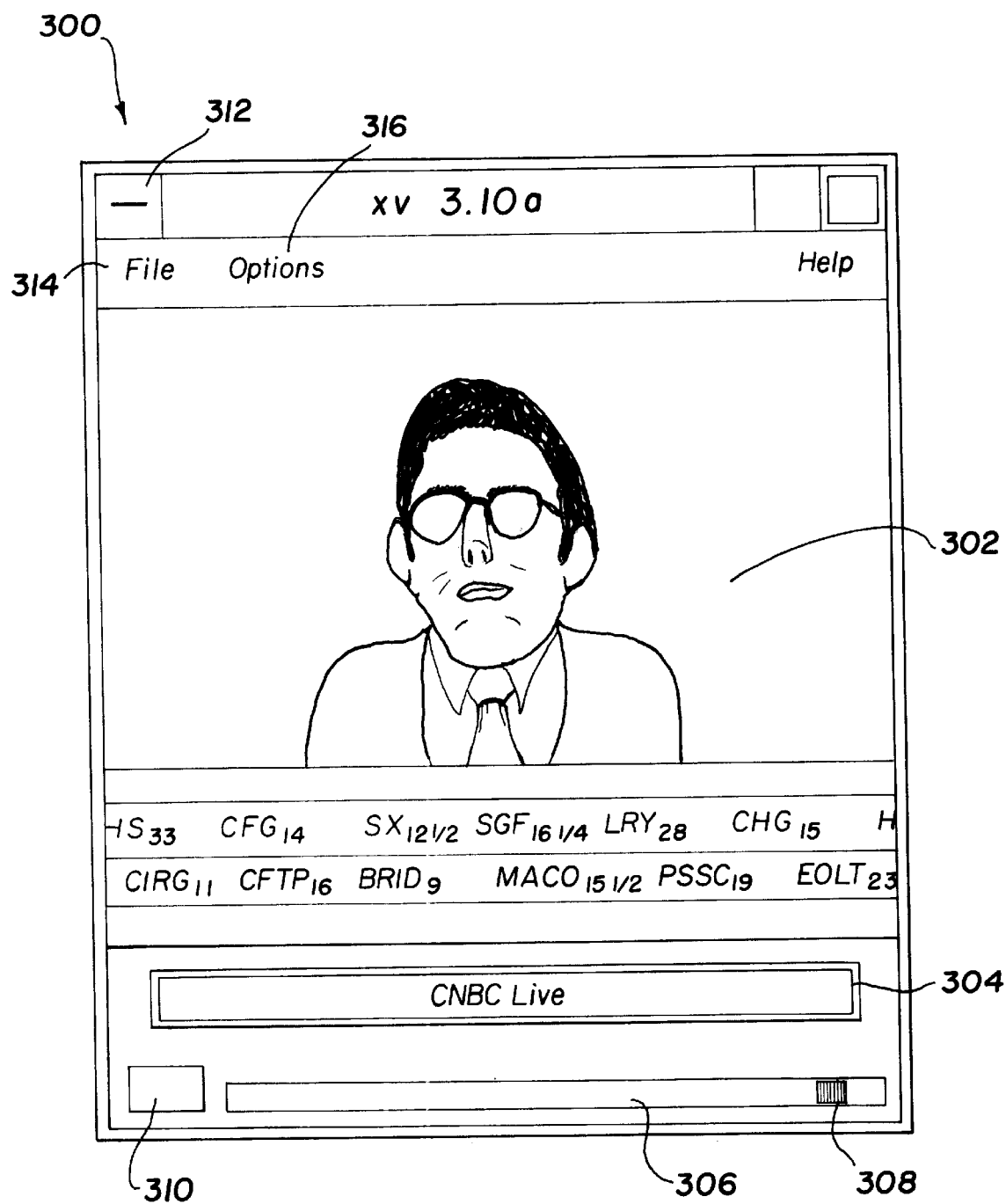
FIG. 4 is the video window opened on the client computer once a broadcast is selected.

Once a channel is selected, a window 300 opens containing the live video feed for that channel. FIG. 4 illustrates the window 300 which centrally displays the image 302. The window 300 can also contain a title bar 304 announcing which channel was selected. In this example, CNBC has been selected. A volume control 306 can be provided wherein a user moves button 308 to increase or decrease the volume. When finished viewing the content, the user can end the transmission by selecting a quit button 310. Other controls can be placed above the display 302. For example, a pull-down file menu 314 and a options menu 316 can be provided. The file menu can include commands to close the window. The user can minimize the window with button 312.

Further, the user can position the display window 300 as well as size it to suit his needs.

A status report 400 can also be generated by the system. An example of such a report 400 is shown in FIG. 5. It includes a title 402 and can include a current time 404. Under the title are summaries 406, 408, 410, and 412 of activity for each channel. For example, summary 408 details usage of the ESPN2 channel. The summary lists the address of the host computer 414, the appropriate port 416, the address of the requesting machine 418. The start time 420 of the broadcast is also listed. The system administrator also has the ability to control the duration of a client computer's access to a video broadcast. For example, a limit of fifteen minutes might be placed on a particular user for a particular broadcast. Thus, the summary can also include the time to run 422 and the time left 424 for a particular channel.

It will be appreciated that the detailed disclosure has been presented by way of example only and is not intended to be limiting. Various alterations, modifications and improvements will readily occur to those skilled in the art and may be practiced without departing from the spirit and scope of the invention. The invention is limited only as required by the following claims and equivalents thereto.

I claim:

1. A method of distributing a video broadcast on a LAN having at least one server computer and at least one client computer, said method comprising:

(a) receiving at least one video broadcast by said at least one server computer;

(b) creating a file with an identifier of said video broadcast;

(c) responding to a request for video broadcasts from the client computer with a menu of available broadcasts;

(d) providing a selected video broadcast to the client computer; and (e) displaying said selected video broadcast in a window on the client computer,
wherein each video broadcast displayed on each client computer includes different video broadcasts simultaneously displayed to different client computers.

2. The method of claim 1 wherein the step of responding comprises comparing a list of available broadcasts to a list of broadcasts approved for the client computer.

3. The method of claim 1 wherein the step of responding comprises constructing a menu having a thumbnail image of the available broadcasts.

4. The method of claim 3 wherein the step of constructing further comprises updating the representative image after a predetermined time.

5. The method of claim 1 comprises adjusting a volume of the selected video broadcasts.

6. The method of claim 1 further comprises:

(f) ending the selected video broadcast after a predetermined period of time.

7. The method of claim 5 further comprises:

(g) generating a summary of usage.

8. A method of controlling the distribution of video broadcasts to a plurality of client computers from at least one server computer connected by a LAN, said method comprising:

(a) receiving a plurality of audio and video broadcasts by the at least on server computer;

(b) creating a file of identifiers for the plurality of broadcasts;

(c) establishing an access list for the plurality of client computers defining which audio and video broadcasts are accessible to an individual client computer;

(d) generating a menu of accessible broadcasts for display on the individual client computer;

(e) providing a selected broadcast to an approved client computer wherein different broadcasts are displayed simultaneously on different client computers.

9. The method of claim 8 further comprising:

(f) restricting access to broadcasts not listed on the menu.

10. The method of claim 9 further comprises:

(g) discontinuing said provided broadcast after a predetermined period.

11. A controller for distributing video broadcasts to a plurality of client computers from at least one server computer connected by a LAN, said method comprising:

(a) a receiver coupled to said at least one server for receiving a plurality of audio and video broadcasts;

(b) means for creating a file of identifiers for the plurality of broadcasts;

(c) means for establishing an access list for the plurality of client computers defining which audio and video broadcasts are accessible to an individual client computer;

(d) means for generating a menu of accessible broadcasts for display on the individual client computer;

(e) means for providing a selected broadcast to an approved client computer wherein different selected broadcasts are provided to different approved client computer simultaneously.

12. The controller of claim 11 further comprises:

(f) means for restricting access to broadcasts not listed on the menu.

13. The controller of claim 11 further comprises:

(g) means for discontinuing said provided broadcast after a predetermined period.

* * * * *

UNITED STATES PATENT AND TRADEMARK OFFICE
CERTIFICATE OF CORRECTION

| | | |
|---|---|---|
| PATENT NO. | : 6,226,030 B1 | Page 1 of 1 |
| APPLICATION NO. | : 08/829555 | |
| DATED | : May 1, 2001 | |
| INVENTOR(S) | : John P. Harvey et al. | |

It is certified that error appears in the above-identified patent and that said Letters Patent is hereby corrected as shown below:

Claim 8, paragraph (a), change "at least on server" to --at least one server--.

Signed and Sealed this
Eighteenth Day of December, 2012

David J. Kappos
*Director of the United States Patent and Trademark Office*

UNITED STATES PATENT AND TRADEMARK OFFICE
CERTIFICATE OF CORRECTION

PATENT NO. : 6,226,030 B1  
APPLICATION NO. : 08/829555  
DATED : May 1, 2001  
INVENTOR(S) : John P. Harvey et al.

Page 1 of 1

It is certified that error appears in the above-identified patent and that said Letters Patent is hereby corrected as shown below:

Column 5, line 21 (Claim 8, paragraph (a)) change "at least on server" to --at least one server--.

This certificate supersedes the Certificate of Correction issued December 18, 2012.

Signed and Sealed this
Twenty-sixth Day of February, 2013

Teresa Stanek Rea
*Acting Director of the United States Patent and Trademark Office*